(12) United States Patent
Katsu et al.

(10) Patent No.: US 8,432,369 B2
(45) Date of Patent: Apr. 30, 2013

(54) TERMINAL DEVICE WITH DISPLAY FUNCTION

(75) Inventors: Eita Katsu, Osaka (JP); Michiaki Koizumi, Osaka (JP)

(73) Assignee: KYOCERA Corporation, Kyoto (JP)

( * ) Notice: Subject to any disclaimer, the term of this patent is extended or adjusted under 35 U.S.C. 154(b) by 306 days.

(21) Appl. No.: 12/864,738

(22) PCT Filed: Jan. 23, 2009

(86) PCT No.: PCT/JP2009/051083
§ 371 (c)(1),
(2), (4) Date: Jul. 27, 2010

(87) PCT Pub. No.: WO2009/096334
PCT Pub. Date: Aug. 6, 2009

(65) Prior Publication Data
US 2010/0315371 A1    Dec. 16, 2010

(30) Foreign Application Priority Data

Jan. 29, 2008    (JP) .................................. 2008-018363

(51) Int. Cl.
*G09G 5/00*    (2006.01)
(52) U.S. Cl.
USPC .......................................... 345/173; 345/169
(58) Field of Classification Search .......... 345/156–158, 345/168, 169, 173
See application file for complete search history.

(56) References Cited

U.S. PATENT DOCUMENTS

| 4,952,932 A | 8/1990 | Sugino et al. |
| 7,999,872 B2 * | 8/2011 | Suzuki et al. .................. 345/173 |
| 8,217,904 B2 * | 7/2012 | Kim .............................. 345/173 |

FOREIGN PATENT DOCUMENTS

| JP | 01-125614 | 5/1980 |
| JP | 08-076925 | 3/1996 |
| JP | 2728128 B2 | 12/1997 |
| JP | 2007-318423 | 12/2007 |

OTHER PUBLICATIONS

Notification of Grounds for Rejections dated Aug. 29, 2011, issued for counterpart Korean Application No. 2010-7019057.
PCT/ISA210, application No. PCT/JP2009/051083, Feb. 26, 2009.
International Preliminary Report on Patentability issued in corresponding application PCT/JP2009/051083 dated Aug. 12, 2010, 13 pages.

* cited by examiner

*Primary Examiner* — Regina Liang
(74) *Attorney, Agent, or Firm* — Procopio, Cory, Hargreaves & Savitch LLP (57) ABSTRACT

A terminal device with a display function enables only an operation of a desired operation key valid, and easily perform the invalidation operation. In response to switching to a predetermined function mode by manipulating a jog dial, an image in the switched function mode is displayed in a display surface, based on an image signal from a display control section. A bar is located on a borderline between a contents area and an operation area in an initial state of displaying an image. When the jog dial is manipulated by the user to thereby move the bar from the borderline to a predetermined position within the operation area, a CPU determines that the position of the bar has been moved. Then, the CPU detects a new position of the bar, and makes an operation with respect to the operation key located between the bar and the borderline invalid.

11 Claims, 9 Drawing Sheets

| MODE | OPERATION KEYS AS INVALIDATION CANDIDATES | SETTING OF FUNCTIONS ALLOCATED TO OPERATION KEYS | |
|---|---|---|---|
| TELEPHONE | OPERATION KEY A | FUNCTION a1→INVALID | FUNCTION a2→VALID |
| | OPERATION KEY B | FUNCTION b1→INVALID | FUNCTION b2→INVALID |
| | OPERATION KEY C | FUNCTION c1→INVALID | |
| | OPERATION KEY D | FUNCTION d1→INVALID | FUNCTION d2→INVALID |
| | OPERATION KEY E | FUNCTION e1→INVALID | |
| | ⋮ | ⋮ | ⋮ |
| TV | OPERATION KEY A | FUNCTION A1→INVALID | FUNCTION A2→INVALID |
| | OPERATION KEY B | FUNCTION B1→INVALID | |

(b)

| MODE | INVALIDATION CANDIDATES | SETTING OF FUNCTIONS CORRELATED TO OPERATION KEYS | |
|---|---|---|---|
| TELEPHONE | OPERATION KEY A | FUNCTION a1→INVALID | FUNCTION a2→INVALID |
| | OPERATION KEY B | FUNCTION b1→VALID | |
| | OPERATION KEY C | FUNCTION c1→SETTING c | |
| | OPERATION KEY D | FUNCTION d1→INVALID | FUNCTION d2→VALID |
| | OPERATION KEY E | FUNCTION e1→SETTING e | |
| | ⋮ | ⋮ | ⋮ |
| TV | OPERATION KEY A | FUNCTION A1→INVALID | |
| | OPERATION KEY B | FUNCTION B1→SETTING b | |

TERMINAL DEVICE WITH DISPLAY FUNCTION

FIELD OF THE INVENTION

The invention relates to a terminal device with an image display function, and more particularly to a mobile terminal device such as a mobile phone and a PDA (Personal Digital Assistant).

BACKGROUND

In recent years, there have been increasing mobile terminal devices such as a mobile phone and a PDA, wherein a touch panel is disposed on a display surface, and a user is allowed to perform various operations by pressing operation keys displayed on the display surface with the user's finger or a touch pen.

Since the touch panel responds even to a small pressing force, the touch panel is likely to be operated even when the user does not intend to operate. Accordingly, there is a problem that the device is likely to be erroneously activated.

To solve the above problem, there is proposed an arrangement of providing a switch section switchable between states of making input through an input section (operation keys) valid and invalid, as necessary.

SUMMARY OF THE INVENTION

In the above arrangement, however, it is impossible to make only the operation keys which are not used invalid, and good usability has not been obtained.

In view of the above, an object of the invention is to provide a terminal device with a display function that enables to make only an operation of a desired operation key invalid, and easily perform the invalidation operation.

In view of the above problem, the invention has the following features.

A terminal device with a display function according to a first aspect of the invention includes a display section; a display control section which divides a display area of the display section into a first display area and a second display area to display images corresponding to the respective areas; operation keys to be displayed in the second display area; a moving element which is displayed in the display area, and is movable in an array direction of the first display area and the second display area; a first operating section which allows a user to move the moving element; and a function control section which makes an operation of the operation key located between a stop position of the moving element and the first display area in the array direction invalid.

A terminal device with a display function according to a second aspect of the invention includes a display section; an area dividing section which divides a display area of the display section into a first display area and a second display area; a display control section which displays operation keys in the second display area; a moving element which is displayed in the display area, and is movable in an array direction of the first display area and the second display area; a first operating section which allows a user to move the moving element; and a function control section which makes an operation of the operation key displayed between the moving element and the first display area invalid, in response to stopping of the moving element after the moving element is moved by the first operating section.

A program according to a third aspect of the invention provides a computer in a terminal device with a display function for dividing a display area into a first display area and a second display area, displaying operation keys in the second display area, and displaying, in the display area, a moving element movable in an array direction of the first display area and the second display area, with a function of making an operation of an operation key displayed between the moving element and the first display area invalid, in response to stopping of the moving element after the moving element is moved in the second display area.

A program according to a fourth aspect of the invention provides a computer in a terminal display device with a display function with a function of making an operation of an operation key between the moving element and a boundary of the display area invalid, in response to stopping of the moving element after the moving element is moved in a display area of the operation key.

The drawings are provided mainly for describing the invention, and do not limit the scope of the invention.

DETAILED DESCRIPTION

In the following, an embodiment of the invention is described referring to the drawings.

In the embodiment, a liquid crystal display device 600 corresponds to "a display section" in the claims; and a contents area R1 and an operation area R2 respectively correspond to "a first display area" and "a second display area" in the claims. Further, a display control section 110 corresponds to "a display control section" and "an area dividing section" in the claims; and a memory 700 corresponds to "a storing section" in the claims. "A function control section" in the claims is realized as a function to be provided to a CPU 100 by a control program stored in the memory 700. Further, a bar 6 corresponds to "a moving element" in the claims, and a jog dial 7 corresponds to "a first operating section", "a second operating section", and "a third operating section" in the claims. An operation of e.g. rotating or pressing the jog dial 7 corresponds to an operation to be performed by the first operating section, the second operating section, and the third operating section. Further, a transmission key K1, character input keys K2, a verbal communication start key K3, a verbal communication end key K4, ten keys K5, channel feed keys K6, channel number keys K7, and corresponds to "operation keys" in the claims.

Figure 1:
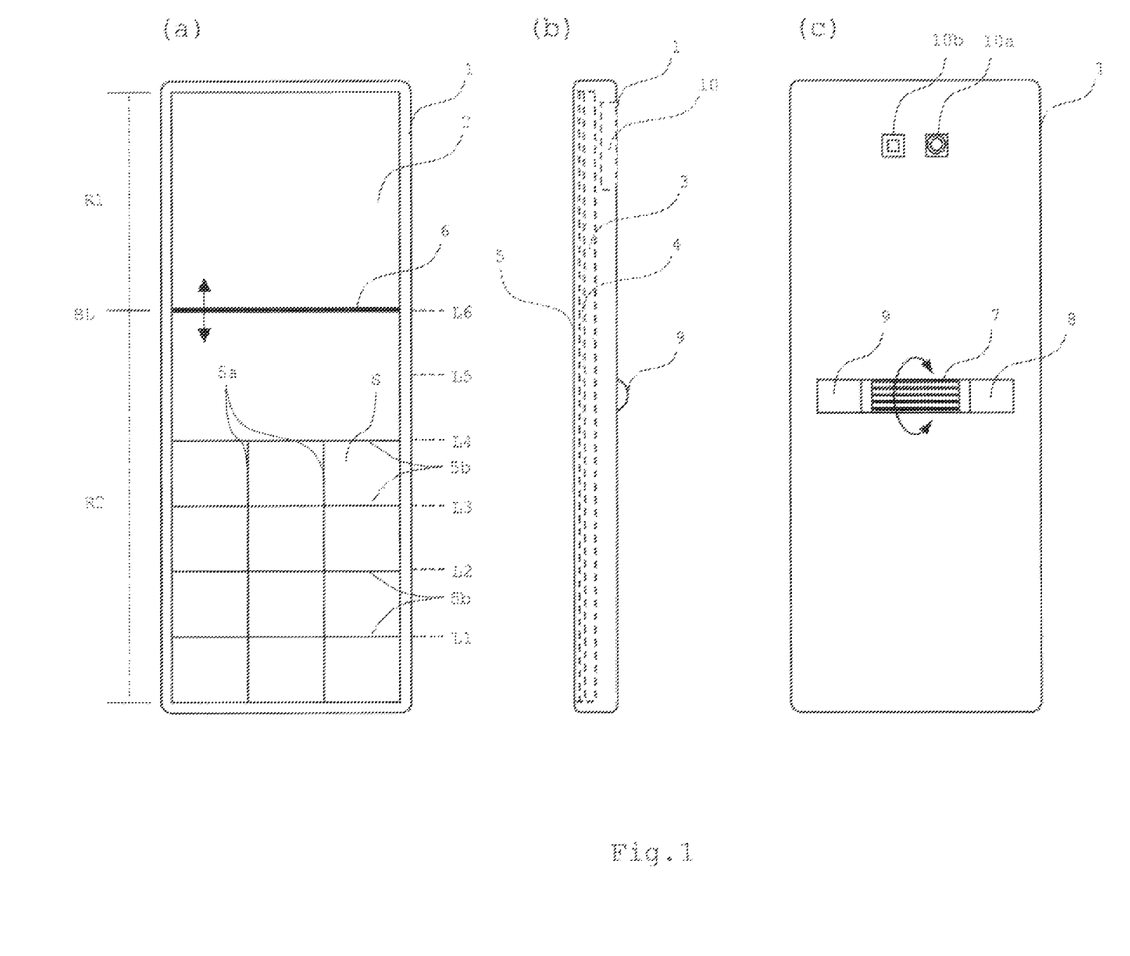
FIG. 1 is a diagram showing an arrangement of a mobile phone in accordance with an embodiment.

FIG. 1 is a diagram showing an arrangement of a mobile phone, as an embodiment of a terminal device. FIG. 1(a), FIG. 1(b), and FIG. 1(c) are respectively a front view, a right side view, and a rear view.

Referring to FIG. 1, the mobile phone of the embodiment has a cabinet 1 constituting an outer casing of the mobile phone. The cabinet 1 has a rectangular shape with a vertically long length in front view. A display surface 2 is formed substantially on the entirety of a front surface of the cabinet 1. Similarly to the cabinet 1, the display surface 2 has a rectangular shape with a vertically long length.

The display surface 2 is constituted of a liquid crystal panel 3. A touch panel 4 is disposed in front of the liquid crystal panel 3. The touch panel 9 detects a position on the display surface 2, which has been depressed by the user, and outputs a signal (a position signal) indicating the position. A protection panel 5 is disposed in front of the touch panel 4. The protection panel 5 is adapted to protect the touch panel 4 from damages. Vertical grooves 5a and horizontal grooves 5b are formed in a grid pattern in a lower area on a surface of the protection panel 5. When a character and/or a symbol representing a function is displayed in a corresponding square region S defined by the grooves 5a and 5b, each of the square regions S serves as an operation key (a soft key) for allowing the user to perform various operations. In the case where an operation area R2 described hereinafter is formed in an area including an area where the square regions S are not formed, operation keys for allowing the user to recognize a boundary to an adjacent function are displayed in the area where the square regions S are not formed by encircling a character representing the function by a square mark.

The horizontally extending bar 6 is displayed on the display surface 2. The bar 6 divides a display area of the display surface 2 into upper and lower two screen areas. The upper area with respect to the bar 6 serves as the contents area R1, and the lower area with respect to the bar 6 serves as the operation area R2. Various contents such as television images, photographs and texts are displayed in the contents area R1. Further, various operation keys are displayed in the operation area R2. The user is allowed to move the bar 6 up and down in the display area by manipulating the jog dial 7.

The jog dial 7 is disposed at a center portion on a back surface of the cabinet 1, and is rotated in up and down directions. When the jog dial 7 is rotated in upward direction, the bar 6 is moved in upward direction; and when the jog dial 7 is rotated in downward direction, the bat 6 is moved in downward direction. The jog dial 7 is also moved in forward and backward directions, and functions as a push button.

An R button 8 and an L button 9 are disposed on the left and on the right of the jog dial 7, respectively. The user is allowed to perform a predetermined operation by operating the R button 8 and the L button 9.

A camera module 10 is provided on an upper part in the interior of the cabinet 1. A imaging lens 10a and a flash section 10b of the camera module 10 are provided outward on the back surface of the cabinet 1.

In the mobile phone, the display screen is switchable between various function modes (including telephone mode, mail mode, television mode, music mode, internet mode, and camera mode) by fixing the bar 6 to a predetermined position.

In view of the above, plural fixed positions (e.g. L1 through L6) are set on the display surface 2 in up and down directions. For instance, in the case where the user manipulates the jog dial 7, moves the bar 6 to the fixed position L5, and presses (short-time presses) the jog dial 7 for a short time in a state that the bar 6 is in the fixed position L5, an image in the television mode is displayed. Further, in the case where the user moves the bar 6 to the fixed position L6, and presses the jog dial 7 for a short time thereat, an image in the television mode is switched to an image in the mail mode. The position of the bar 6 in an initial state of switching is defined as a borderline BL between the contents area R1 and the operation area R2 in images in these function modes.

FIG. 2(a) shows a screen display example in the television mode. FIG. 2(b) shows a screen display example in the mail mode. In the television mode, as shown in FIG. 2(a), image contents are displayed in the contents area R1, and plural operation keys for allowing the user to perform operations relating to image display are displayed in the operation area R2. In the mail mode, as shown in FIG. 2(b), for instance, inputted characters are displayed in the contents area R1, and operation keys for allowing the user to input a mail message or transmit/receive mails are displayed in the operation area R2.

Figure 3:
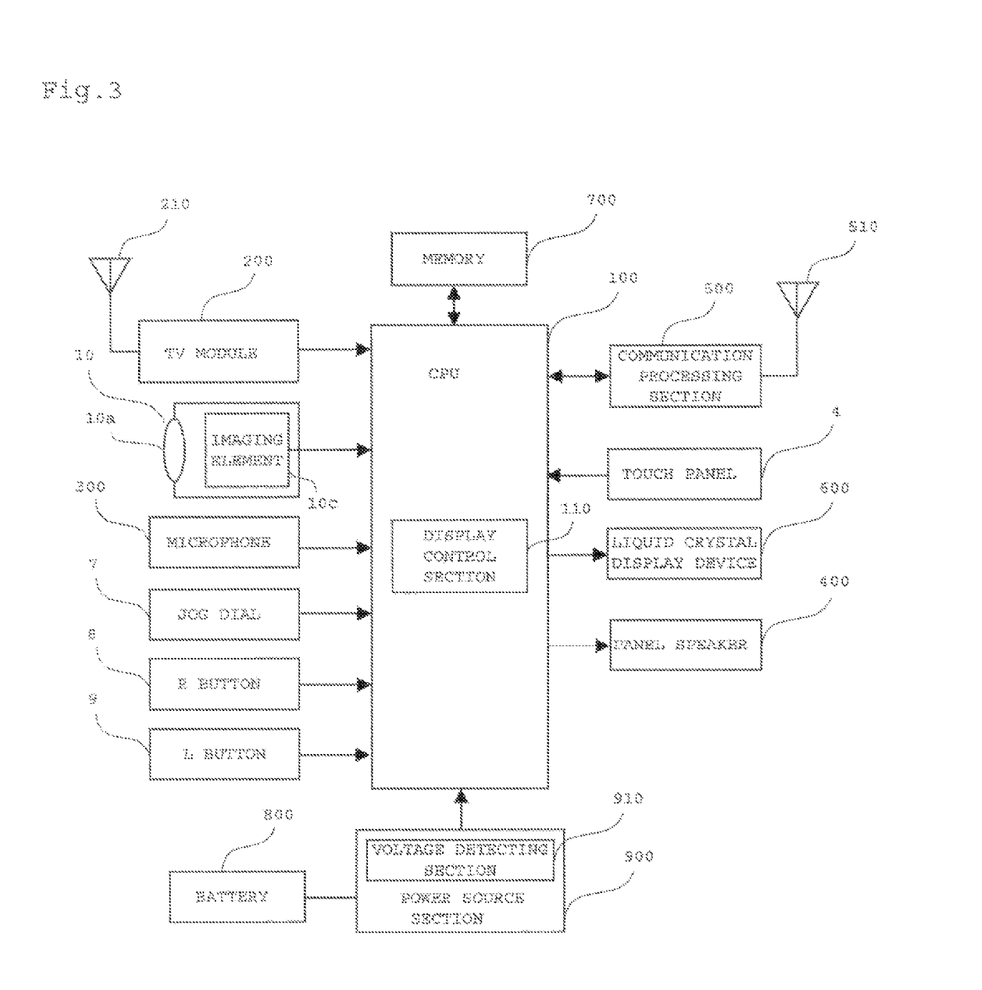
FIG. 3 is a block diagram showing a circuit configuration of the mobile phone of the embodiment.

FIG. 3 is a block diagram showing a circuit configuration of the mobile phone in accordance with the embodiment. The mobile phone includes a CPU 100, a TV module 200, a microphone 300, a panel speaker 400, a communication processing section 500, a liquid crystal display device 600, a memory 700, a battery 800, and a power source section 900, in addition to the aforementioned components described referring to FIG. 1.

The TV module 200 includes a TV tuner, converts a radio wave such as a terrestrial digital broadcast wave or a terrestrial analog broadcast wave received through an antenna 210 into a video signal, and transmits the video signal to the CPU 100.

The camera module 10 includes an imaging element 10c, in addition to the imaging lens 10a and the flash section 10b. The imaging lens 10a forms an image of a subject on the imaging element 10c. The imaging element 10c is constituted of e.g. a CCD, generates an image pickup signal corresponding to a picked up image, and transmits the image pickup signal to the CPU 100.

The microphone 300 converts a sound signal into an electrical signal, and transmits the electrical signal to the CPU 100. The panel speaker 400 reproduces a sound signal from the CPU 100 as a sound.

The communication processing section 500 converts e.g. a sound signal, an image signal, or a text signal from the CPU 100 into a radio signal, and transmits the radio signal to a base station through an antenna 510; and converts the radio signal received through the antenna 510 into e.g. a sound signal, an image signal, or a text signal, and transmits the signal to the CPU 100.

The liquid crystal display device 600 includes the liquid crystal panel 3, and a backlight device (not shown) serving as a light source of the liquid crystal panel 3, and displays an image on the liquid crystal panel 3 by a drive signal from the CPU 100.

The memory 700 is provided with an ROM (Read Only Memory) and an RAM (Random Access Memory). The ROM stores e.g. a control program for operating the CPU 100, and table information to be referred to in executing the control program. For instance, a table, in which the fixed positions of the bar 6 and the function modes are correlated to each other, is stored as the table information. The ROM further stores a first setting table and a second setting table to be described later.

Further, the RAM saves e.g. image data photographed by the camera module 10, or image data or text data (mail data) acquired from an external device through the communication processing section 500 in a predetermined file format. The RAM also saves image contents (such as television programs and movies) acquired from an external device by the TV module 200 or the communication processing section 500.

The battery 800 supplies an electric power to the CPU 100 and various parts of the mobile phone other than the CPU 100. The battery 800 is constituted of a secondary battery. The battery 800 is connected to the power source section 900.

The power source section 900 converts a voltage of the battery 800 into a voltage of a required level for the respective parts, and supplies the voltage to the respective parts. Further, the power source section 900 supplies an electric power supplied through an input section (not shown) of an external power source to the battery 800 to charge the battery 800. The power source section 900 is provided with a voltage detecting section 910. The voltage detecting section 910 detects a voltage of the battery 800, and supplies the voltage to the CPU 100.

The CPU 100 controls the respective parts in accordance with the control program and the table information stored in the memory 700 (ROM). For instance, the CPU 100 outputs a control signal to e.g. the panel speaker 400 and the liquid crystal display device 600, based on an input signal from e.g. the touch panel 4, the jog dial 7, the R button 8, the L button 9, the microphone 300, and the imaging element 10*c* to thereby perform a predetermined processing in the respective function modes. The CPU 100 also determines the residual amount of the battery 800, based on a voltage signal from the voltage detecting section 910. The CPU 100 also performs a processing of causing the liquid crystal display device 600 to display various images in the respective function modes.

A processing function (a display processing function) with respect to the liquid crystal display device 600, out of the control processing functions provided to the CPU 100 by the control program, is particularly called as the "display control section 110", and the display control section 110 is illustrated in the CPU 100 in FIG. 3 for convenience of description.

The display control section 110 generates an image to be displayed on the liquid crystal display device 600 within a memory (not shown) serving as a work area prepared in the CPU 100, and outputs an image signal (an RGB signal) to the liquid crystal display device 600 for causing the liquid crystal display device 600 to display the generated image. The display control section 110 also acquires e.g. image data transmitted from the imaging element 10*c*, image data saved in the memory 700, or image data (image contents) received through the TV module 200 or the communication processing section 500. Then, the display control section 110 generates an image signal (an RGB signal) based on the acquired image data, and outputs the generated image signal to the liquid crystal display device 600. The liquid crystal panel 3 of the liquid crystal display device 600 i.e. the display surface 2 displays an image (including video) in accordance with the image signal.

As described above, in the case where the jog dial 7 is manipulated, the operation amount of the jog dial 7 is determined in the CPU 100. Then, an image signal is transmitted from the display control section 110 based on the operation amount to thereby move the bar 6 displayed on the display surface 2 by the operation amount.

In the mobile phone of the embodiment, various operations are mainly performed by the operation keys of the touch panel disposed in the operation area R2. Since the touch panel 4 responds even to a small pressing force, the touch panel 4 is likely to be operated even when the user does not intend to operate. Therefore, for instance, while the user inputs a mail message by the character input keys, the user's finger may touch an operation key near the character input key in operation, and other processing may be performed. Further, in the case where the mobile phone is put in a pocket or a bag, an object may be contacted with an operation key, and the mobile phone may be erroneously activated.

In view of the above, in this embodiment, an erroneous activation of the device resulting from an inadvertent operation against the user's will is prevented by executing a key operation invalidation processing of making an operation of an operation key invalid in response to the user's manipulation.

Figure 4:
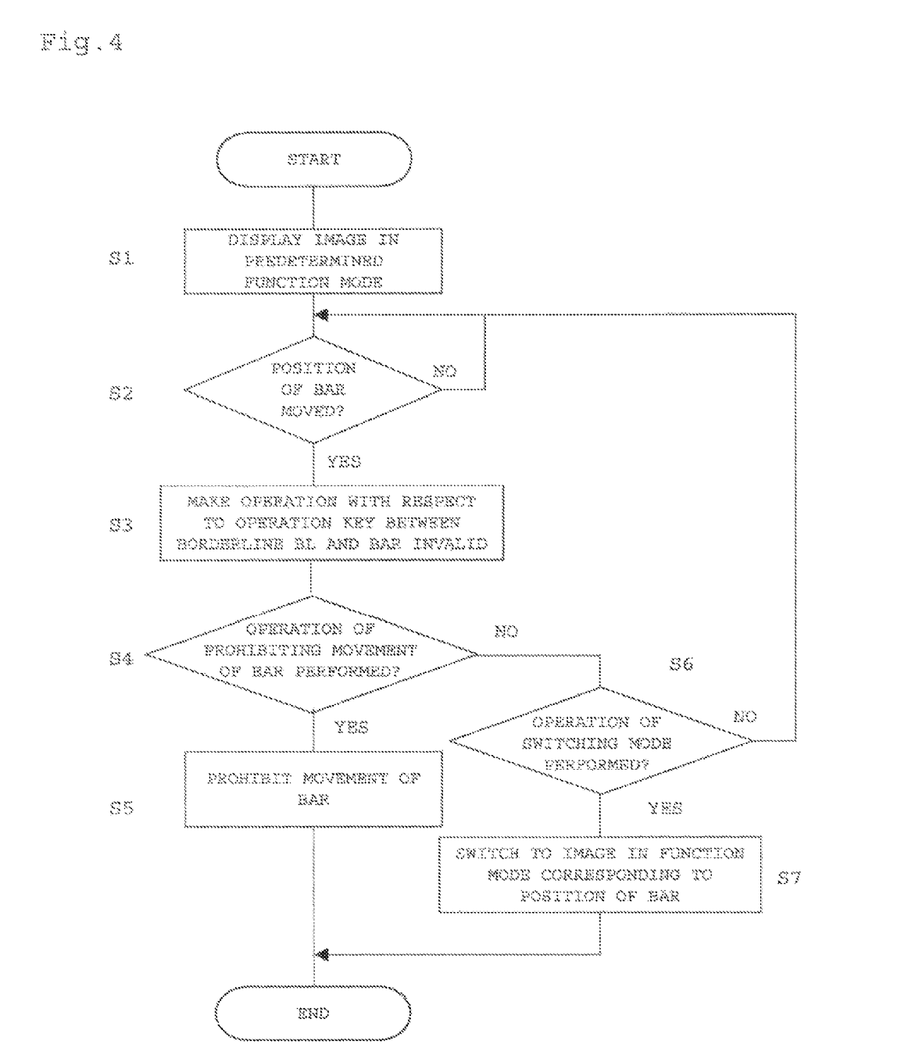
FIG. 4 is a flowchart for describing a sequence of a key operation invalidation processing in the mobile phone of the embodiment.
Figure 5:
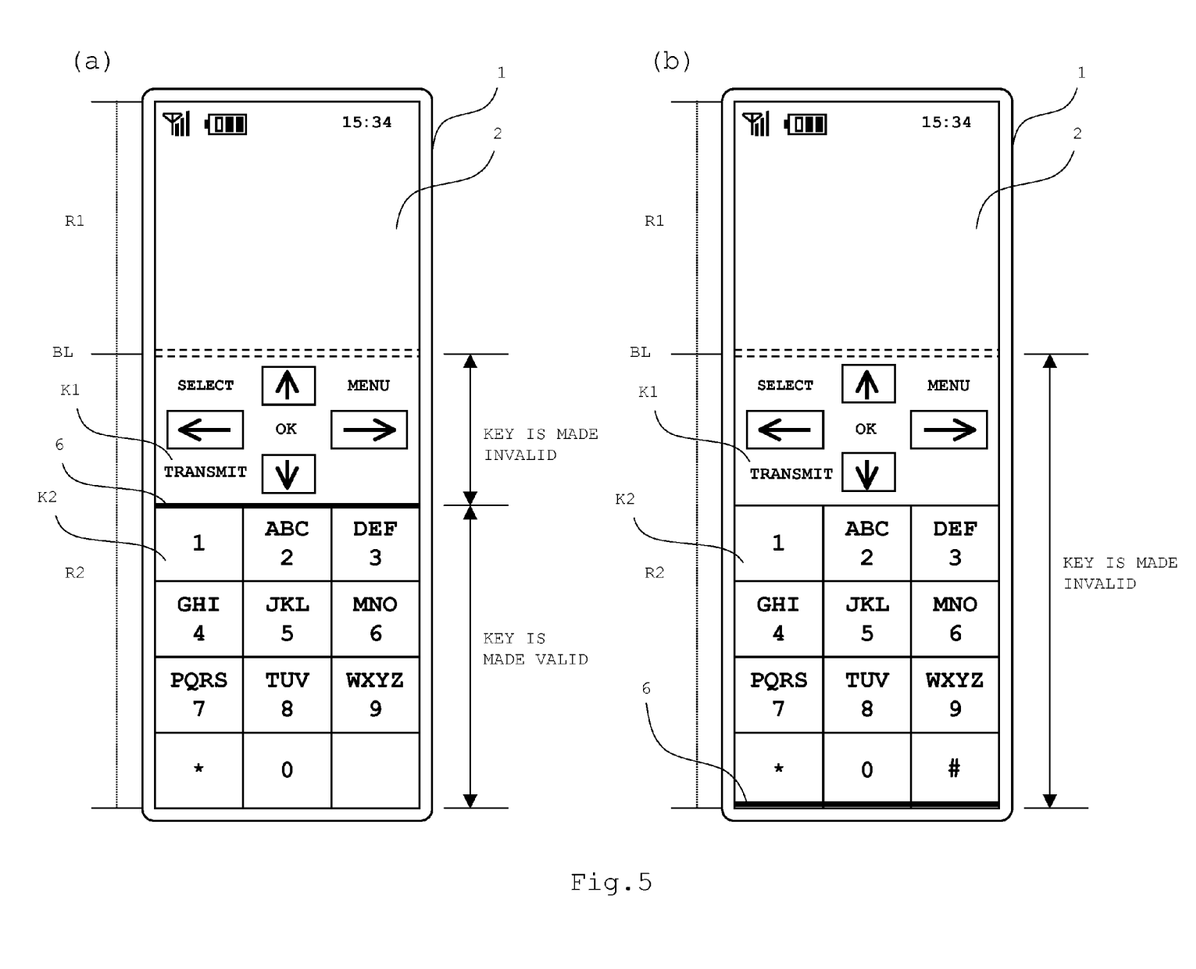
FIG. 5 is a diagram showing screen display examples, in the case where a key operation invalidation operation is performed in a mail mode of the mobile phone of the embodiment.

FIG. 4 is a flowchart for describing a sequence of a key operation invalidation processing. FIG. 5(*a*) and FIG. 5(*b*) are diagram showing screen display examples, in the case where a key operation invalidation operation is performed in the mail mode.

Figure 2:
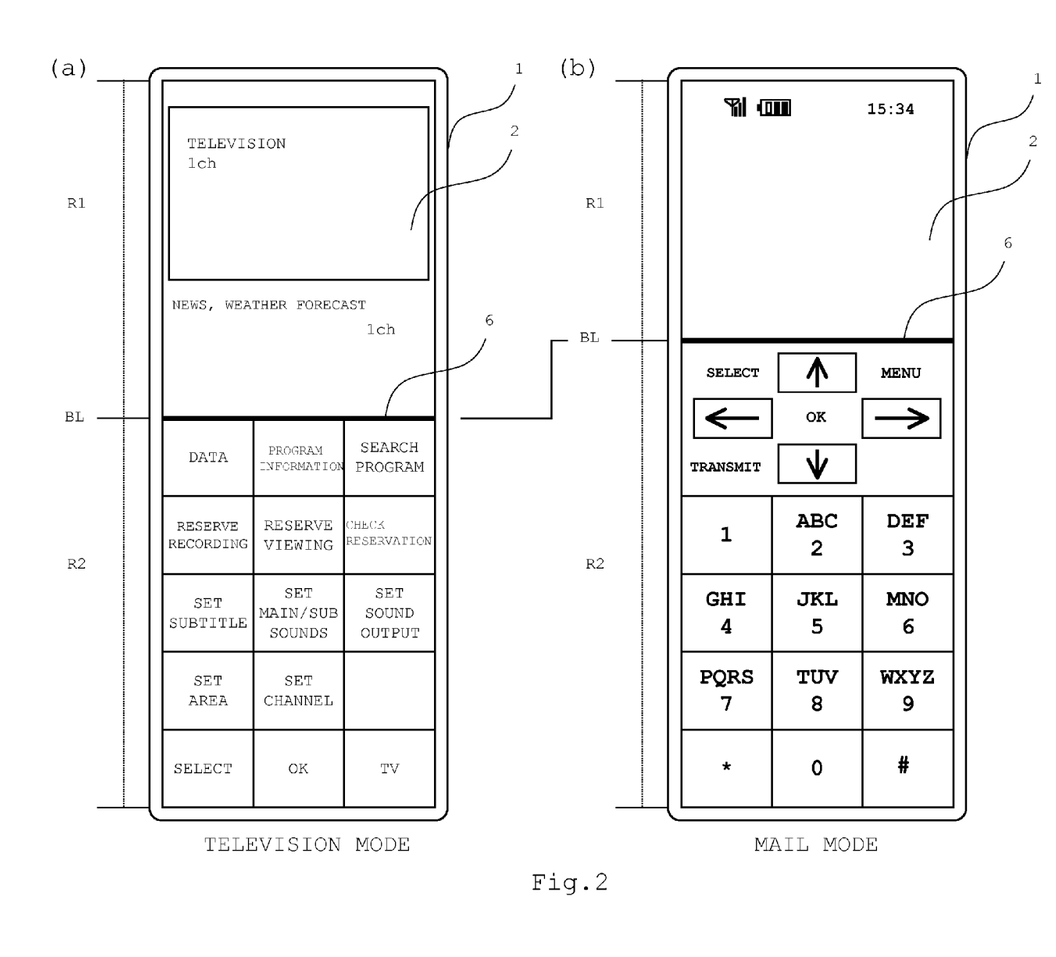
FIG. 2 is a diagram showing screen display examples of a television mode and a mail mode in the mobile phone of the embodiment.

The sequence is described referring to FIGS. 4 through 5(*b*). As described above, in response to switching to a predetermined function mode by manipulating the jog dial 7, an image in the switched function mode is displayed on the display surface 2, based on an image signal from the display control section 110 (S1). For instance, in the mail mode, the image shown in FIG. 2(*b*) is displayed. The bar 6 is located on the borderline BL between the contents area R1 and the operation area R2 in an initial state of displaying an image (see FIG. 2(*b*)).

In response to the user's manipulation of the jog dial 7 to thereby move the bar 6 from the borderline BL to a predetermined position within the operation area R2, the CPU 100 determines that the position of the bar 6 has been moved (YES in S2). Then, the CPU 100 detects a new position of the bar 6, and performs a setting of making an operation with respect to an operation key within an area (a key invalidation area) between the bar 6 and the borderline BL invalid.

For instance, as shown in FIG. 5(*a*), in the case where the bar 6 is located between the transmission key K1 and the character input keys K2, operation keys in an upper position with respect to the character input keys K2 such as the transmission key K1 are made invalid, and the character input keys K2 are made valid. Accordingly, the user is allowed to input a mail message by the character input keys K2. In this arrangement, for instance, even if the user inadvertently touches the transmission key K1 in an upper position of the character input key K2 indicating the Japanese character "あ", in an attempt to press the character input key K2, there is no likelihood that a mail may be transmitted against the user's will.

As shown in FIG. 5(*b*), when the bar 6 is moved to a lowermost part of the operation area R2, the entirety of the operation area R2 is defined as a key invalidation area, and all the operation keys are made invalid. In this example, when the bar 6 is located in a certain position within the disposition area of the sixteen character input keys K2, only the character input keys K2 within the key invalidation area are made invalid. However, it is meaningless to make a part of the character input keys K2 invalid. In view of this, in the case where a part of the character input keys K2 is located within a key invalidation area, all the character input keys K2 may be made invalid. Alternatively, all the character input keys K2 may be made invalid when all the character input keys K2 are located within a key invalidation area. In other words, in the case where operation keys having the same function are disposed in a group, it is desirable to make all the operation keys in a group invalid.

Subsequently, the CPU 100 determines whether an operation of prohibiting movement of the bar 6 has been performed (S4). For instance, the user is allowed to perform the operation prohibiting movement by pressing (long-time pressing) the jog dial 7 for a long time. If the CPU 100 determines that the operation of prohibiting movement of the bar 6 has been performed (YES in S4), the CPU 100 performs a setting of prohibiting movement of the bar 6 by manipulation of the jog dial 7 (S5). Based on the above setting, the display control section 110 keeps the bar 6 from moving within the display area, even if the jog dial 7 is manipulated. Thus, for instance, in the case where the user puts the mobile phone in a bag or a pocket, by performing an operation of prohibiting movement of the bar 6 in a state that all the operation keys are made invalid, there is no likelihood that the invalidation area of operation keys may be varied even if the jog dial 7 is inadvertently operated in the bag or the pocket. This enables to prevent an erroneous activation of the device.

Then, if the operation of prohibiting movement of the bar 6 is not performed (NO in S4), and as described above, an operation of switching the mode by short-time pressing the jog dial 7 is performed (YES in S6), the CPU 100 performs a setting of switching to an image in the function mode corresponding to the position of the bar 6 (S7). As a result of the above operation, an image in a new function mode is displayed on the display surface 2, based on an image signal from the display control section 110.

As described above, in the embodiment, an operation key invalidation area is defined by the borderline BL between the contents area R1 and the operation area R2, and the bar 6; and only an operation of the operation keys within the invalidation area is made invalid. Accordingly, the user is allowed to make an operation key which is not necessary for a current operation invalid, and keep on making an operation key necessary for the current operation valid. This allows the user to smoothly perform a necessary operation, while preventing an erroneous activation of the device against the user's will.

Further, in the embodiment, since an operation of making a desired operation key invalid is performed by merely performing an operation of moving the bar 6, the user is allowed to easily perform the key invalidation operation.

Furthermore, in the embodiment, since movement of the bar 6 is prohibited by the user's manipulation, the bar 6 is not moved, even if an operation of moving the bar 6 is inadvertently performed. Accordingly, for instance, even if the jog dial 7 is operated in a pocket or a bag against the user's will in a state that all the keys are made invalid, there is no likelihood that the keys may resume to a valid state. Thus, an erroneous activation of the device against the user's will can be smoothly avoided.

Furthermore, in the embodiment, since the moving element is used in common as an index for switching the function mode, the operation can be simplified, and the operability of the device can be enhanced.

The embodiment of the invention has been described as above, but the invention is not limited to the above. Further, the embodiment of the invention may be changed or modified in various ways as necessary, as far as such changes and modifications do not depart from the scope of the claims of the invention hereinafter defined. For instance, the embodiment may be modified as follows.

Specifically, as will be described below, in the case where one operation key is used to execute plural functions, it is possible to configure an arrangement, wherein an operation by the one operation key corresponding to a part of the functions is made valid (i.e. a part of the functions based on the operation is executed), even if the operation of making the one operation key invalid is performed. The modification enables to execute a necessary function without releasing the operation key invalidation operation. This enhances the usability of the device.

Alternatively, it is possible to configure an arrangement, wherein the setting of a function in association with an operation key is changed in response to an operation of making the operation key invalid. The modification enables to concurrently change the setting of e.g. a function in association with a certain operation key by making the certain operation key invalid. This further enhances the usability of the device.

Figure 6:
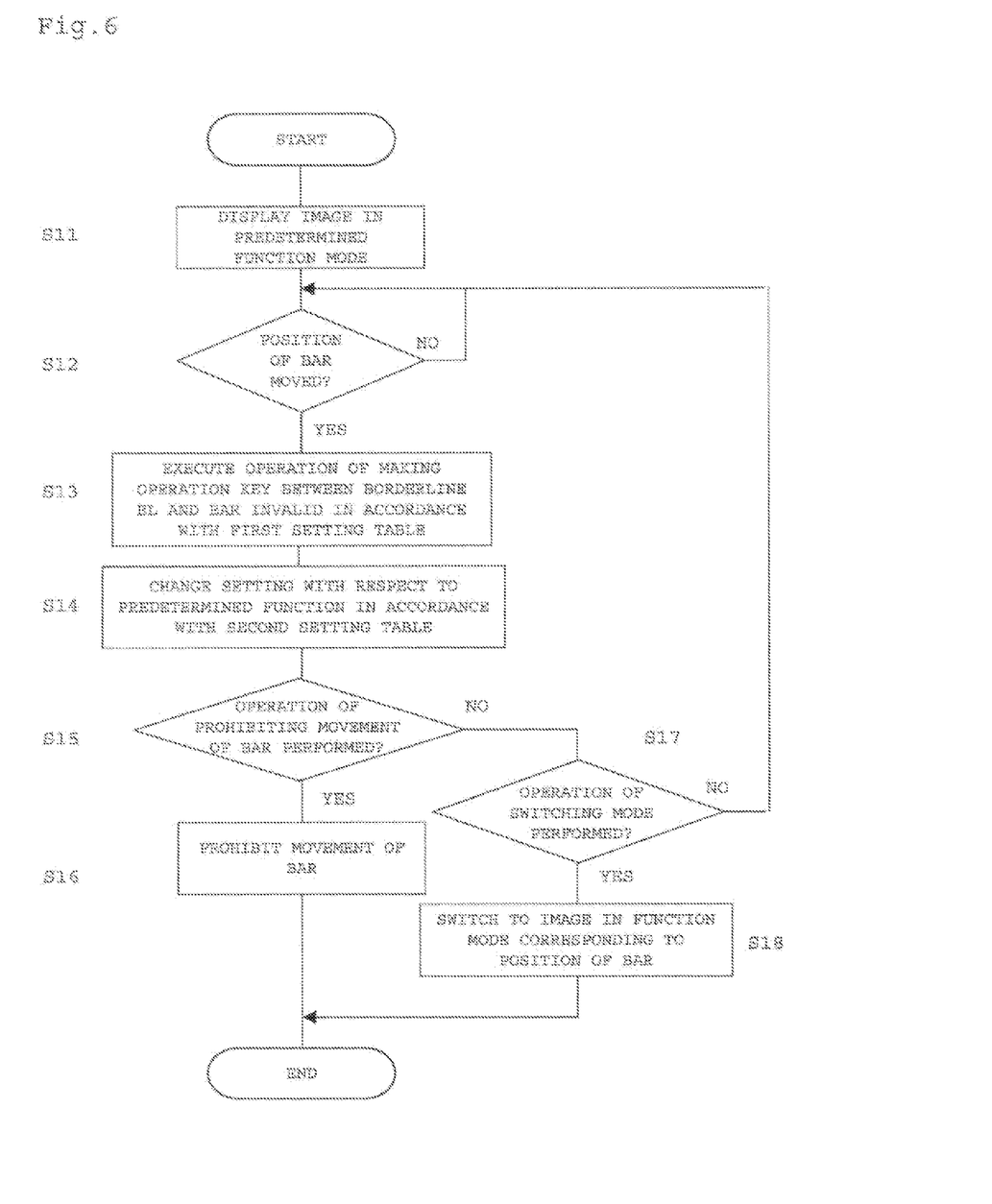
FIG. 6 is a flowchart for describing a sequence of another key operation invalidation processing in the mobile phone of the embodiment.
Figure 7:
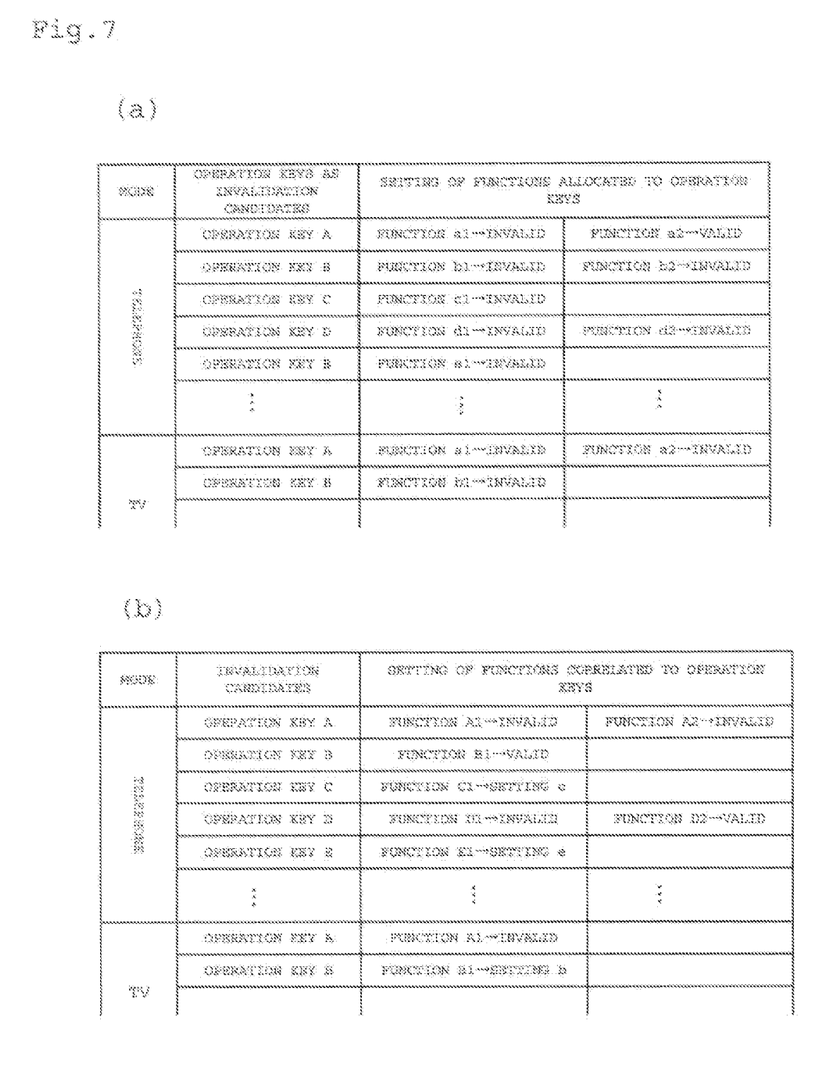
FIG. 7 is a diagram showing arrangements of setting tables to be used in another key operation invalidation processing in the mobile phone of the embodiment.
Figure 8:
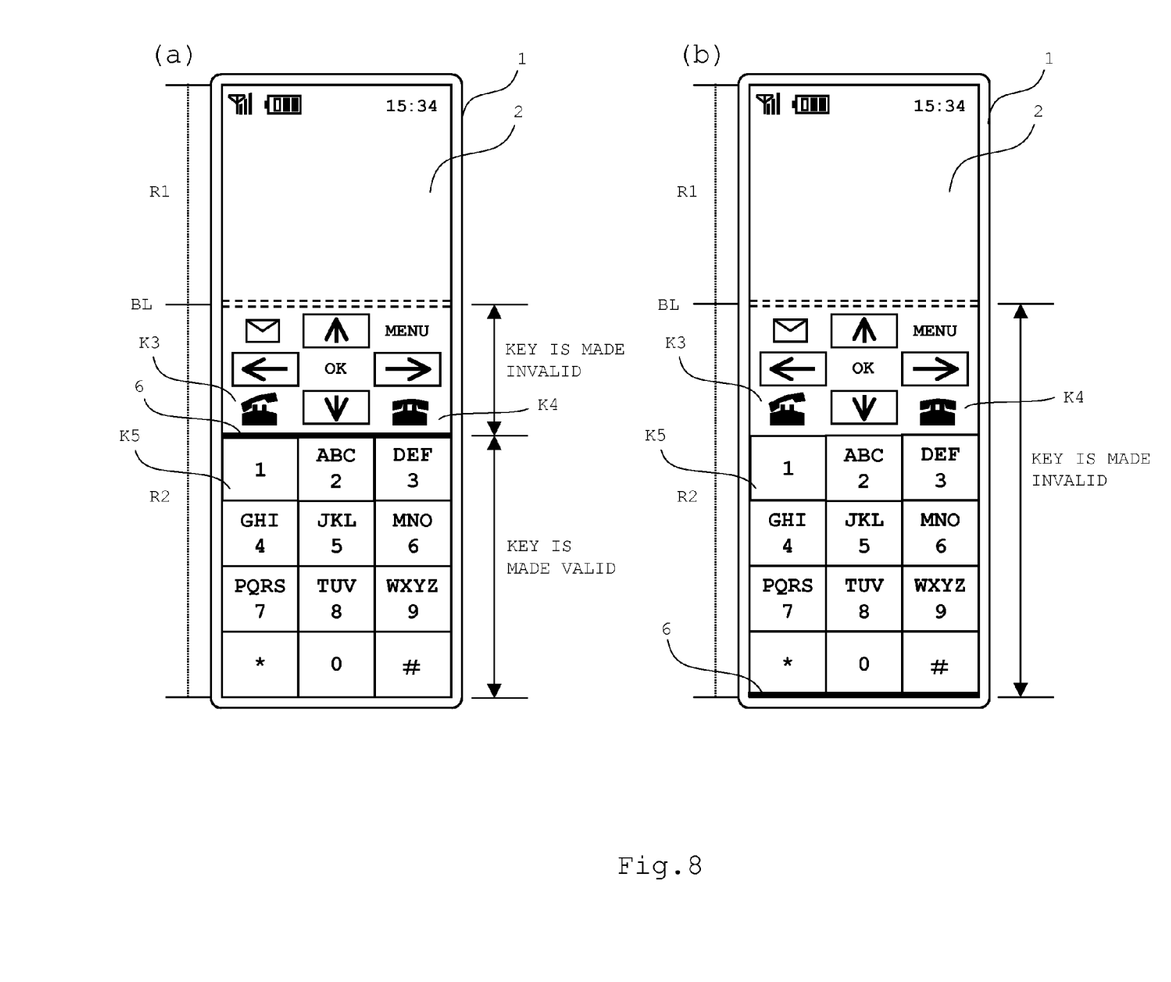
FIG. 8 is a diagram showing screen display examples, in the case where a key operation invalidation operation is performed in a telephone mode of the mobile phone of the embodiment.

FIG. 6 is a flowchart for describing a sequence of another key operation invalidation processing. FIG. 7 is a diagram showing arrangements of setting tables to be used in the another key operation invalidation processing. FIG. 8 is a diagram showing screen display examples, in the case where a key operation invalidation operation is performed in the telephone mode.

The sequence is described referring to FIG. 6 through FIG. 8. Similarly to the above embodiment, if an image in a predetermined function mode is displayed on the display surface 2 (S11), the CPU 100 determines whether the position of the bar 6 has been moved (S12). If it is determined that the position of the bar 6 has been moved (YES in S12), the CPU 100 detects a new position of the bar 6, and executes an operation of making an operation key located between the bar 6 and the borderline BL invalid in accordance with the first setting table stored in the memory 700 (S13).

For instance, as shown in FIG. 8(a), in the case where the bar 6 is located between the verbal communication start key K3 and the ten keys K5 in the telephone mode, the operation keys in the upper position with respect to the ten keys K5, such as the verbal communication start key K3 and the verbal communication end key K4, are set as invalidation candidates.

As shown in FIG. 7(a), the first setting table defines a setting as to whether a function allocated to an operation key is made valid or invalid when the operation key is set as an invalidation candidate in each of the function modes. In the case where one function is allocated to one operation key, the function is made invalid. On the other hand, in the case where, two or more functions are allocated to one operation key, some functions are made valid. For instance, in the case where the verbal communication start key K3 is set as an invalidation candidate in the telephone mode, a call request function of making a phone call is made invalid, and a call receiving function of receiving a phone call is made valid in response to an operation of the verbal communication start key K3.

Then, the CPU 100 changes a setting of a predetermined function in accordance with the second setting table stored in the memory 700 (S14). Specifically, as shown in FIG.07(b), the second setting table defines as to how a setting of a predetermined function is changed in response to a setting of an operating key as an invalidation candidate. For instance, in response to a setting of the verbal communication start key K3 as an invalidation candidate as described above, a setting of making any answer function invalid is performed, and also a setting of making the call request function by an operation key other than the verbal communication start key K3 invalid is performed. The any answer function is a function of allowing the user to start verbal communications by pressing any of the operation keys in response to an incoming call.

In the case where the key invalidation area is set as shown in FIG. 8(a), the user is not allowed to make a phone call, even if the verbal communication start key K3 is operated. However, the user is allowed to receive a phone call by operating the verbal communication start key K3 in response to an incoming call. Accordingly, the user is allowed to receive a phone call in response to an incoming call without performing an invalidation releasing operation, even if the operation of the verbal communication start key K3 has been made invalid.

Further, even if the any answer function is set in advance, since the aforementioned function is made invalid, the user is not allowed to receive a phone call by operating an operating key (e.g. the ten keys K5 whose operation is made valid) other than the verbal communication start key K3. Accordingly, even if the mobile phone is put in e.g. a bag, there is no or less likelihood that an operation of starting verbal communications may be inadvertently started at the time of an incoming call, resulting from e.g. an impact. This enables to prevent the mobile phone from being inadvertently brought to a communication state. Further, since the outgoing call request function by an operation key other than the verbal communication start key K3 is made invalid, the user is not allowed to make a phone call by operating an operation key (e.g. a telephone directory function) other than the verbal communication start key K3.

In the above state, all the operations with respect to the operation keys within the key invalidation area such as the verbal communication end key K4 are not accepted (in other words, functions based on the operation keys are not executed).

As shown in FIG. 8(b), in the case where the bar 6 is moved to the lowermost position in the operation area R2, and the entirety of the operation area R2 is defined as a key invalidation area, all the operations of the ten keys K5 are not accepted.

Subsequently, similarly to the above embodiment, if an operation of prohibiting movement of the bar 6 is performed in a state that the operation key invalidation operation is activated (YES in S15), the CPU 100 performs a setting of prohibiting movement of the bar 6 (S16). Then, if an operation of switching the mode is performed (YES in S17), the CPU 100 switches to an image in a new function mode based on the position of the bar 6 (S18).

Figure 9:
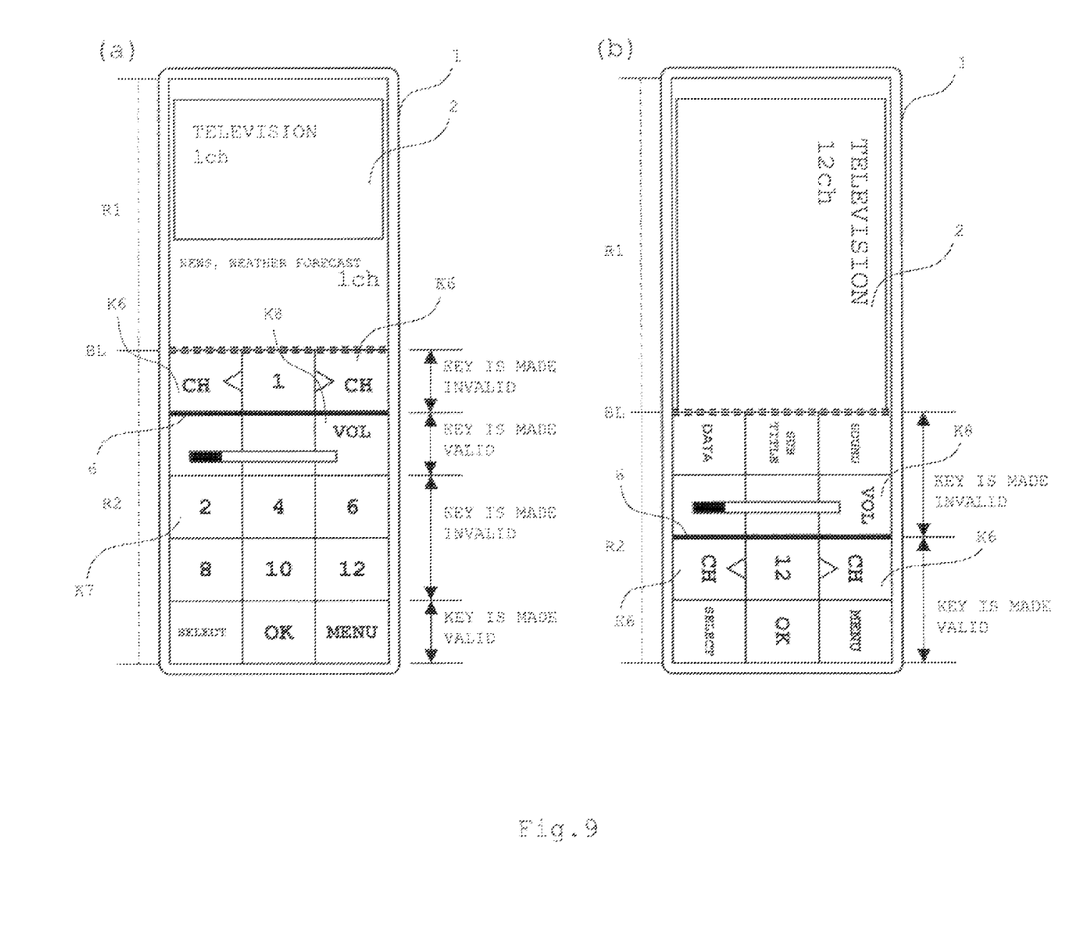
FIG. 9 is a diagram showing screen display examples, in the case where a key operation invalidation operation is performed in a television mode of the mobile phone of the embodiment.

FIG. 9 is a diagram showing screen display examples, in the case where an operation of making a key operation invalid is performed in the television mode. In the television mode, there are prepared a normal mode, wherein the contents area R1 is displayed with a small size, and a television image is displayed with a smaller size in vertical direction as shown in FIG. 9(a); and a wide mode, wherein the contents area R1 is displayed with a large size, and a television image is displayed with a larger size in horizontal direction as shown in FIG. 9(b).

In an image in the normal mode, for instance, there are displayed two kinds of operation keys having a channel selecting function in area R2. One kind of the operation keys is the channel feed keys K6 constituted of a feed key for incrementing the channel number, and a feed key for decrementing the channel number. By operating the corresponding channel feed key K6, the channel number is successively incremented/decremented. The other kind of the operation keys is the channel number keys K7 constituted of six numeral keys corresponding to representative channel numbers. By pressing one of the channel number keys K7, the user is allowed to directly select a desired channel number.

In the image in the normal mode, as shown in FIG. 9(a), in the case where the bar 6 is moved to a position beneath the channel feed keys K6, an operation with respect to the channel feed keys K6 is made invalid. In this state, if the aforementioned second setting table is set as making the channel selecting function by the channel number keys K7 invalid in response to setting the channel feed keys K6 as an invalidation candidate, an operation of the channel number key K7 is also made invalid by moving the bar 6 to a position beneath the channel feed keys K6, as described above. Thus, the user is allowed to set the mobile phone to a channel selection disabled state, without moving the bar 6 to a position beneath the channel number keys K7. Accordingly, as shown in FIG. 9(a), even if the channel feed keys K6 and the channel number keys K7 are disposed away from each other, and other operation key (in this example, the volume key K8) is disposed between these operation keys, it is possible to keep an operation of the other operation key from being made invalid.

In an image in the wide mode shown in FIG. 9(b), in the case where the volume key K8 is in the key invalidation area, an operation of the volume key K8 is made invalid. In this state, if the volume key K8 is set as an invalidation candidate in the second setting table, a sound output function is made invalid. Specifically, in the case where a setting of muting the sound has been made, the sound output is suspended by moving the bar 6 as described above. Thus, the user is allowed to easily mute the sound, as necessary, while keeping the sound volume in an original state.

In the example of FIG. 9(a), an operation of the channel number keys K7 is made invalid in response to making an operation of the channel feed keys K6 invalid. Alternatively, in the case where these operation keys are disposed upside down, it is possible to make an operation of the channel feed keys K6 invalid in response to making an operation of the channel number keys K7 invalid. Further alternatively, it is possible to set the sound volume to a predetermined fixed level, in the ease where an operation of the volume key K8 is made invalid.

In the above embodiment, the bar 6 is operated by jog dial 7. Alternatively, bar 6 may be moved by operating the touch panel 4. In the modification, the user is allowed to move the bar 6 up and down by touching the position of the bar 6 with his or her finger, and moving the finger up and down with respect to the touch panel 4. While the bar 6 is moved over a certain operation key, the operation key is in a state of being pressed by the finger. In view of this, by making an operation of a certain operation key invalid while the bar 6 is being moved over the operation key, inadvertent acceptance of the operation key can be prevented.

In this embodiment, the setting of switching the mode, and prohibiting movement of the bar 6 is performed by short-time pressing or long-tine pressing the jog dial 7. Alternatively, the setting of switching the mode, and prohibiting movement of the bar 6 may be performed simply based on the position of the bar 6, without depending on a pressing time of the jog dial 7. Specifically, it is possible to prohibit movement of the bar 6 in response to pressing the jog dial 7 while the bar 6 is in the lowermost part of the operation area R2; and allow switching of the mode in response to pressing the jog dial 7 while the bar 6 is in a certain position (a fixed position) within the operation area R2.

Generally, it is often the case that movement of the bar 6 is prohibited when the mobile phone is not used. In this case, it is more likely that all the operation keys are made invalid. In view of the above, in most of the cases, it is conceived that the object is achieved by prohibiting movement of the bar 6 while the bar 6 is in the lowermost part of the operation area R2.

However, since the lowermost part is not a fixed position for switching the mode, it is impossible or difficult to switch the mode while the bar 6 is in the lowermost part. In view of the above, an operation of switching the mode is performed while the bar 6 is in a certain position (a fixed position) within the operation area R2.

As described above, it is often the case that movement of the bar 6 is prohibited while the bar 6 is in the lowermost part of the operation area R2; and an operation of switching the mode is necessary while the bar 6 is in a certain position (a fixed position) within the operation area R2. In view of the above, a described above, it is possible to meet the demands of a majority of the users by: prohibiting movement of the bar 6 in response to pressing the jog dial 7 while the bar 6 is in the lowermost part of the operation area R2; and performing an operation of switching the mode in response to pressing the jog dial 7 while the bar 6 is in a certain position (a fixed position) within the operation area R2.

By performing the above operation, there is no need of switching a processing depending on a pressing time of the jog dial 7. This enables to simplify the processing. Further, since the user does not have to pay attention to a pressing time of the jog dial 7, the user's operation can be simplified.

Alternatively, in the mail mode, it is possible to accept an operation of an operation key when a new mail has been transmitted in a state that the operation key for Shifting to display of a list of received mails is made invalid. The modification allows the user to swiftly check the new mail.

Further, in the embodiment, the operating section for an operation of moving the bar 6, an operation of prohibiting movement of the bar 6, and an operation of switching the mode may be realized by the jog dial 7. Alternatively, the operations are realized by individual operating sections. For instance, the R button 8 may serve as an operating section for an operation of switching the mode, and the L button 9 may serve as an operating section for an operation of prohibiting movement of the bar 6.

Furthermore, in the embodiment, the moving element of the invention is an image of the bar 6 extending over the entire transverse length of the display surface 2. Alternatively, other image such as an arrow image in transverse direction may be used.

In the embodiment, a control program for executing the key invalidation processing (see FIG. 6), and the table information (see FIG. 7) used for the control program are preinstalled in the memory 700 (ROM) in the mobile phone. Alternatively, the control program and the table information may be downloaded from e.g. a website and stored into the memory 700 through the communication processing section 500. Further alternatively, the control program and the table information may be inputted to the mobile phone by attaching a storage medium such as a memory card storing the control program and the table information, to the mobile phone.

Further, the embodiment is configured to store a table, in which the fixed positions of the bar 6 and the function modes are correlated to each other, into the memory 700 (ROM); and to switch the display screen to an image in a corresponding function mode, based on the table, in response to changing the fixed position of the bar 6 in performing an operation of switching the mode. Alternatively, for instance, the invention may be configured to store a table, in which a ratio between respective areas obtained by dividing an entire display area of the display surface 2 in two areas by a fixed position of the bar 6, and a function mode are correlated to each other, into the memory 700; and to switch the display screen to an image in a corresponding function mode, based on the table, in performing an operation of switching the mode. Specifically, the recitation "stores the position of the moving element and the function mode in correlation to each other" in the claims may embrace an arrangement of storing a function mode by indirect correlation to the position of the moving element, such as an arrangement of storing a ratio between the respective areas obtained by dividing the display area by the moving element, and a function mode in correlation to each other, in addition to the arrangement of storing the position of the moving element and a function mode by direct correlation to each other.

The embodiment of the invention may be changed or modified in various ways as necessary, as far as such changes and modifications do not depart from the scope of the claims of the invention hereinafter defined.

What is claimed is:

1. A terminal device with a display function, comprising:
   a display section;
   a display control section which divides a display area of the display section into a first display area and a second display area to display images corresponding to the respective areas;
   operation keys to be displayed in the second display area;
   a moving element which is displayed in the display area, and is movable in an array direction of the first display area and the second display area;
   a first operating section which allows a user to move the moving element; and
   a function control section which makes an operation of the operation key located between a stop position of the moving element and the first display area in the array direction invalid.

2. The terminal device with the display function according to claim 1, further comprising:
   a second operating section which allows the user to perform an operation of prohibiting movement of the moving element, wherein the display control section prohibits movement of the moving element in response to user's manipulation of the second operating section.

3. The terminal device with the display function according to claim 1, further comprising:
   a third operating section which allows the user to perform an operation of switching a function mode; and
   a storing section which stores a position of the moving element and the function mode in correlation to each other, wherein
   the display control section displays, in response to user's manipulation of the third operating section, an image in accordance with the function mode corresponding to the position of the moving element in the respective areas obtained by dividing the display area by the moving element.

4. The terminal device with the display function according to claim 1, further comprising:
   a third operating section which allows the user to perform an operating of switching a function mode; and
   a storing section which stores a ratio of each area obtained by dividing the display area by the moving element, and the function mode in correlation to each other, wherein the display control section displays, in response to user's manipulation of the third operating section, an image in accordance with the function mode corresponding to the ratio in the respective areas obtained by dividing the display area by the moving element.

5. The terminal device with the display function according to claim 1, wherein
   the function control section makes a part of functions allocated to the operation key valid in a state that the operation key is set as invalid.

6. The terminal device with the display function according to claim 1, further comprising:
  a table, in which a function to be changed in a setting when the operation key is made invalid is correlated to the corresponding operation key, wherein
  the function control section changes the function corresponding to the key which is made invalid by movement of the moving element, based on the table.

7. A terminal device with a display function, comprising:
  a display section;
  an area dividing section which divides a display area of the display section into a first display area and a second display area;
  a display control section which displays operation keys in the second display area;
  a moving element which is displayed in the display area, and is movable in an array direction of the first display area and the second display area;
  a first operating section which allows a user to move the moving element; and
  a function control section which makes an operation of the operation key displayed between the moving element and the first display area invalid, in response to stopping of the moving element after the moving element is moved by the first operating section.

8. The terminal device with the display function according to claim 7, further comprising:
  a second operating section which allows the user to perform an operation of prohibiting movement of the moving element.

9. The terminal device with the display function according to claim 7, wherein
  the function control section makes a part of functions allocated to the operation key valid in a state that the operation key is set as invalid.

10. The terminal device with the display function according to claim 7, further comprising:
  a table, in which a function to be changed in a setting when the operation key is made invalid is correlated to the corresponding operation key, wherein
  the function control section changes the function corresponding to the key which is made invalid by movement of the moving element, based on the table.

11. A non-transitory computer readable medium for a computer in a terminal device, the non-transitory computer readable medium having stored thereon one or more sequences of instructions for causing one or more processors to perform the steps for displaying information in a display area, the steps comprising:
  dividing a display area into a first display area and a second display area,
  displaying operation keys in the second display area, and
  displaying, in the display area, a moving element movable in an array direction of the first display area and the second display area,
  making an operation of an operation key displayed between the moving element and the first display area invalid, in response to stopping of the moving element after the moving element is moved in the second display area.

* * * * *